United States Patent [19]

Hirano et al.

[11] Patent Number: 4,731,303
[45] Date of Patent: Mar. 15, 1988

[54] CUBIC BORON NITRIDE COATED MATERIAL AND PRODUCING METHOD OF THE SAME

[75] Inventors: Shin-ichi Hirano, Nagoya; Susumu Yamaya, Kawasaki, both of Japan

[73] Assignee: Toshiba Tungaloy Co., Ltd., Japan

[21] Appl. No.: 886,068

[22] Filed: Jul. 16, 1986

[30] Foreign Application Priority Data

Jul. 17, 1985 [JP] Japan .............................. 60-157682

[51] Int. Cl.$^4$ ..................... C04B 35/58; B32B 15/04
[52] U.S. Cl. ................................... 428/700; 428/698
[58] Field of Search ............... 428/698, 699, 700, 701, 428/472, 471, 330

[56] References Cited

U.S. PATENT DOCUMENTS

| | | | |
|---|---|---|---|
| 4,096,279 | 6/1978 | Pappis et al. | 428/698 X |
| 4,148,964 | 4/1979 | Fedoseer et al. | 428/698 X |
| 4,389,465 | 6/1983 | Nakai et al. | 428/698 |
| 4,403,015 | 9/1983 | Nakai et al. | 428/698 X |
| 4,522,633 | 6/1985 | Dyer | 428/699 X |

FOREIGN PATENT DOCUMENTS 0040552 11/1981 European Pat. Off. ............ 428/698

*Primary Examiner*—Nancy A. B. Swisher
*Attorney, Agent, or Firm*—Schwartz, Jeffery, Schwaab, Mack, Blumenthal & Evans

[57] ABSTRACT

A cubic boron nitride coated material comprises a substrate, an outer layer consisting essentially of cubic boron nitride and formed on a surface of the substrate, and at least one intermediate layer interposed between the substrate and outer layer, the intermediate layer comprising at least one nitrogen-containing compound selected from the nitrides and nitroxides of Al, Ga, In and Tl and mutual solid solutions thereof. Such a coated material can be produced by a method that comprises:

providing, on the surface of a substrate, at least one intermediate layer comprised of at least one nitrogen-containing compound selected from the group consisting of nitrides and nitroxides of Al, Ga, In and Tl and mutual solid solutions thereof; and causing the outer cubic boron nitride layer to undergo oriented growth on a face of the layer of the at least one nitrogen-containing compound, the face being densely packed with nitrogen atoms.

8 Claims, No Drawings

CUBIC BORON NITRIDE COATED MATERIAL AND PRODUCING METHOD OF THE SAME

BACKGROUND OF THE INVENTION

This invention relates to cubic boron nitride coated material useful as a tool, such as a cutting tool, a wear resistant tool and the like, and as a electronic part, such as a semiconductor substrate and the like, and to the producing method thereof.

Boron nitride (BN) is generally present in two forms, one being low-density boron nitride and the other high-density boron nitride. Of these, as a representative example of high-density boron nitride, there is cubic boron nitride which is synthesized under special conditions such as high-pressure and high-temperature.

Cubic boron nitride has high hardness, high heat conductivity and high electric insulating property, second to diamond, and moreover, enjoys chemical stability, oxidation resistance, heat resistance and thermal shock resistance all better than diamond. While diamond has high affinity with Iron-group metals, cubic boron nitride has low affinity with them. Therefore there has been interest in using cubic boron nitride, for example, as a material for tools used for cutting or grinding Irongroup metal materials. In spite of such excellent properties as mentioned above, cubic boron nitride is brittle and has low sinterability and limitations are hence imposed on its shape and application.

Thus, it has been attempted to form cubic boron nitride as a coating layer on a surface of a substrate in order to solve the above-mentioned limitations to shape and application.

Formation of coating layers of boron nitride can generally be carried out, roughly speaking, by chemical vapor deposition method (CVD method), physical deposition method (PVD method) and plasma-assisted CVD method (PCVD method). Of these, CVD method is effected by using, in an illustrative example, reactant gases comprising a boride such as a boron halogenide or diborane, hydrogen, and ammonia or hydrazine. PVD method includes, for example, the ion beam deposition method, ion injection method, sputtering method and ion plating method as well as combinations of the ion injection method with other PVD methods. In plasma-assisted CVD method, a coating layer of boron nitride is synthesized in a vapor phase in the stream of plasma. Japanese Provisional Patent Publication No. 95881/1982 discloses tools obtained by forming coating layers actually consisting of cubic boron nitride on substrates.

Among conventional methods for forming coating layers consisting of boron nitride the CVD method is accompanied by a problem that coating layers comprising of hexagonal boron nitride or amorphous boron nitride can only be formed because it is a mere thermal vapor-phase synthesis. On the other hand, when PVD method or plasma-assisted CVD method is relied upon, a coating layer composed of boron nitride having a relatively high hardness is formed. Cubic boron nitiride has been considered to be the component of this coating layer. Coating layers formed by PVD or plasma-assisted CVD method are, however, accompanied by such drawbacks that they contain cubic boron nitride at low contents and due to the overall low hardness of the coating layers and the weak bonding between the coating layers and their corresponding substrates, the resultant coated layers cannot be used for actual applications.

In Japanese Provisional Patent Publication No. 95881/1982, which discloses tools produced in accordance with these conventional methods, coating layers made of cubic boron nitride are formed directly on surfaces of sintered silicon nitride bodies as substrates. They are produced by conventional CVD, PVD or plasma-assisted CVD method or alternatively by coating the surfaces with hexagonal boron nitride and then heat-treating the coating layers of hexagonal boron nitride to form coating layers consisting of cubic boron nitride. Therefore, the above-mentioned coated tools are accompanied by such drawbacks that even if coating layers of cubic boron nitride are formed on the surfaces of the substrates, the cubic boron nitride content in the coating layers are very low or otherwise the adhesion between substrates and their corresponding coating layers are poor.

SUMMARY OF THE INVENTION

An object of this invention is to solve the abovementioned problems and drawbacks, and specifically to provide a cubic boron nitride coated material having a substrate and dense outer layer of cubic boron nitride formed and firmly adhered on the substrate by interposing an intermediate layer, which has such properties as to induce oriented growth of cubic boron nitride, between the substrate and the outer layer. It is also an object of this invention to provide a method for producing a cubic boron nitride coated body having the above mentioned features.

In one aspect of this invention, there is thus provided a cubic boron nitride coated material including a substrate and an outer layer composed principally of cubic boron nitride and formed on a surface of the substrate, which comprises an intermediate layer formed of at least one intermediate layer and interposed between the substrate and outer layer, said intermediate layer or the outermost one of intermediate layers being formed of a layer of at least one nitrogen-containing compound selected from the nitrides and nitroxides of Al, Ga, In and Tl and mutual solid solutions thereof.

In another aspect of this invention, there is also provided a producing method of a cubic boron nitride material by forming, on a surface of a substrate, an outer layer composed principally of cubic boron nitride, which comprises:

providing, on the surface of the substrate, an intermediate layer formed of at least one intermediate layer, said intermediate layer or the outermost one of intermediate layers being formed of a layer of at least one nitrogen-containing compound selected from the nitrides and nitroxides of Al, Ga, In and Tl and mutual solid solutions therof; and causing the outer layer to undergo oriented growth on a face of the layer of said at least one nitrogen-containing compound, said face being densely packed with nitrogen atoms.

DESCRIPTION OF THE PREFERRED EMBODIMENTS

The present inventors conducted an investigation on the effects of concurrent presence of aluminum nitride to the transformation of various types of boron nitride to cubic boron nitride. As a result, it was found that although the activation energy required for the direct transformation of hexagonal boron nitride to cubic boron nitride was 150 to 250 kcal/mole, the activation energy required for the transformation of hexagonal boron nitride to cubic boron nitride in the concurrent presence of aluminum nitride is as low as 40 kcal/mole, and that the activation energy required for the transformation to cubic boron nitride of amorphous boron nitride, the latter having been obtained by thermal decomposition of borazine under elevated pressure in the concurrent presence of aluminum nitride and had high activity, was 11 to 20 kcal/mole. In other words, certain catalytic effects of aluminum nitride were found. Based on such catalytic effects of aluminum nitride, the present inventors attempted to elucidate the mechanism of transformation of boron nitride to cubic boron nitride. Neither fusion product nor intermediate compound was found to occur between boron nitride and aluminum nitride. It has thus been confirmed that the mechanism of formation of cubic boron nitride in the BN-AlN system is different from the dissolution and precipitation mechanism which had conventionally been reported with respect to other catalysts. As to the growth of cubic boron nitride on a sintered aluminum nitride body, the (111) face of cubic boron nitride became extremely predominant as the growth of cubic boron nitride proceeded and no diffusion of aluminum nitride into cubic boron nitride was recognized. From these results, it has been found that the use as a base face of the nitrogen-packed crystalline face of aluminum nitride having the wurtzite-type structure allows the (111) face of cubic boron nitride, said face being a crystalline face packed densely with nitrogen atoms, to undergo oriented growth on the base face, leading to completion of this invention.

In the cubic boron nitride coated material according to this invention, cubic boron nitride is formed the outer layer in the form of a dense and uniform, thick or thin film, and the intermediate layer formed of the single intermediate layer or the plurality of intermediate layers is interposed between the outer layer and substrate. The coated material according to this invention has hence excellent adhesion properties and chipping resistance between the outer layer and intermediate layer, between the intermediate layer and the substrate, and where the plurality of intermediate layers are provided, within the intermediate layers, whereby various superb properties of the outer layer can be fully exhibited. For example, the coated material according to this invention can be used as a cutting tool or wear resistant tool by making use of the high hardness, heat conductivity, wear resistance, oxidation resistance, heat resistance and chemical stability of the outer layer. Further, making use of the high heat conductivity and electrical insulating property of the outer layer, the coated material according to this invention can also be used as semiconductor substrate, including an ECL or LSI package or a heat sink member for the multichip module of a bipolar LSI memory or the mount of a communications semiconductor laser.

When the outer layer is allowed to grow to a thick film, the crystalline face of cubic boron nitride making up the outermost part of the outer layer is formed as (111) face substantially in its entirety. As has been known very well, this face has the highest hardness and is excellent in wear resistance so that superb advantages have been brought about from the view point of its use as cutting tool or wear resistance tool. In addition, the outer layer, the outermost surface of which is the (111) face of cubic boron nitride, exhibits excellent effects in both heat conductivity and electric insulating property. It can therefore be used for parts of various materials by using its isotropic nature.

Coated material according to this invention are therefore useful in the industry, namely, can be as materials for parts in many industrial fields such as tools, electronic devices, precision instruments and robots. The producing method according to this invention is suitable for the production of such coated material.

The above and other objects, features and advantages of the present invention will become apparent from the following description of the invention and appended claims.

No particular limitation is imposed on substrates useful in the practice of this invention, so long as they can withstand producing conditions to be described subsequently. For example, a variety of metals, alloys, sintered high-speed steels, sintered hard alloys, cermets, ceramics and the like may be selectively employed depending what end use will be made.

The outer layer composed principally of cubic boron nitride can be produced in a form ranging from a thin film on the order of μm to a thick film on the order of mm. When it is formed as a layer in the form of a thin film, it is an outer layer made of cubic boron nitride. When it is formed as layer in the form of a boron thick film, it may be an outer layer made of cubic nitride or an outer layer made of cubic boron nitride and at least one additional component selected from Fe, Ni, Co, Al and Si, the metal of Groups IVa (Ti, Zr and Hf), Va (V, Nb and Ta) and VIa (Cr, Mo and W) of the Periodic Table, the nitrides and oxides of Al and Si, and the carbides, nitrides and borides of the metal of Groups IVa, Va and VIa of the Periodic Table, and their mutual solid solutions.

The intermediate layer interposed between the substrate and outer layer may take various constitutions in accordance with the kind of each substrate to be used or the application or shape of the resultant coated material according to this invention.

For example, as a first constitution, the intermediate layer may take the form of a nitrogen-containing compound layer composed of at least one component selected from the nitrides and nitroxides of Al, Ga, In and Tl and their mutual solid solutions. Since the layer of the nitrogen-containing compound is interposed between the substrate and outer layer, the excellent properties of the outer layer can be drawn out if the layer of the nitrogen-containing compound is applied to a substrate having excellent adhesion to the same layer, for example, a substrate of an AlN base ceramics, $Al_2O_3$ base ceramics $Si_3N_4$ base ceramics or the like.

As a second constitution, the intermediate layer may be composed of the nitrogen-containing compound layer and a first adhesion enhancement layer formed of at least one component selected form the oxides of Al, Ga, In and Tl, the oxides and nitrides of alkaline earth metals, rare earth metals and Si, and mutual solid solutions thereof. In this case, the first adhesion enhancement layer and nitrogen-containing compound layer are interposed between the substrate and outer layer in such a way that the first adhesion enhancement layer is adjacent to the substrate and the nitrogen-containing compound layer is adjacent to the outer layer. The excellent properties of the outer layer can be drawn out if the first adhesion enhancement layer applied to a substrate having excellent adhesion to the same layer, for example, a substrate of $ZrO_2$ base ceramics, SiC base ceramics, $Si_3N_4$ base ceramics, $Al_2O_3$ base ceramics and the like.

As a third constitution, the intermediate layer may be composed of the nitrogen-containing compound layer, the first adhesion enhancement layer, and a second adhesion enhancement layer formed of at least one component selected from the carbides, nitrides, oxides, borides and silicides of metals of Groups IVa, Va, and VIa of the Periodic Table and mutual solid solutions thereof. In this case, the second adhesion enhancement layer, first adhesion enhancement layer and nitrogen containing compound layer are interposed between the substrate and outer layer in such a way that the second adhesion enhancement layer is adjacent to the substrate, the nitrogen-containing compound layer is adjacent to the outer layer and the first adhesion enhancement layer is interposed between the second adhesion enhancement layer and the nitrogen-containing compound layer. The excellent properties of the outer layer can be exhibited if the second adhesion enhancement layer is applied to a substrate having excellent adhesion to the same layer, for example, to a substrate made of one of various metals or stainless steel, one of various alloys including tool steel, a sintered high-speed steel, a sintered hard alloy, a cermet and the like.

As a fourth constitution, the intermediate layer may be composed of the nitrogen-containing compound layer, the first adhesion enhancement layer, and a second adhesion enhancement layer composed of at least one component selected from the carbides, nitrides, oxides borides and silicides of metals of Groups IVa, Va and VIa of the Periodic Table and at least one additional component selected from Fe, Ni, Co, Cr, Mo and W. In this case, the second adhesion enhancement layer, the first adhesion enhancement layer and nitrogen-containing compound layer are interposed betweeen the substrate and outer layer is such a way that the second adhesion enhancement layer is adjacent to the substrate, the nitrogen-containing compound layer is adjacent to the outer layer and the first adhesion enhancement layer is interposed between the second adhesion enhancement layer and the nitrogen-containing compound layer. Since the intermediate layer of the fourth constitution is often formed especially by the penetration and diffusion of a metal and the like from the substrate into the intermediate layer in the course of its preparation process, the forth constitution is often formed when the substrate is made of a sintered hard alloy or cermet.

As other constitutions of the intermediate layer, various constitutions may be contemplated such as a constitution having the same constitution as the above-mentioned third or fourth constitution and an additional layer of a metal or alloy interposed between the substrate and the second adhesion enhancement layer, a constitution composed in combination of the nitrogen-containing compound layer and a layer of at least one component selected form the carbides, nitrides, oxides, borides and silicides of metals of Groups IVa, Va and VIa of the Periodic Table and mutual solid solutions thereof.

Among these intermediate layers, the above described first, second, third and fourth constitutions are preferred in view of the adhesion between the substrate and the intermediate layer and that between the intermediate layers.

As has been described above, the intermediate layer may be formed into a single-layered or multi-layered structure. It is, however, the most important feature of this invention that at least the intermediate layer, which is adjacent to the outer layer, be a nitrogen-containing compound layer in order to allow cubic nitrogen boride to undergo oriented growth. As the nitrogen-containing compound, aluminum nitroxide formed of aluminum nitride and a trace amount of oxygen bonded to the aluminum nitride or a composite nitride or composite nitroxide of Al and Ga, In or Tl belonging to Group IVb of the Periodic Table is preferred. Aluminum nitride is, however, most preferred from the stability at high temperatures and the effectiveness of the catalyst for the transformation into cubic boron nitride.

The formation of cubic boron nitride on the surface of the nitrogen-containing compound layer is not attributed to the dissolution and precipitation mechanism but to the direct oriented growth of the (111) face of cubic boron nitride, the nitrogen-packed crystal face, on the nitrogen-packed crystal face of the nitrogen-containing compound layer. It is therefore sufficient if the nitrogen-containing compound layer has a thickness enough to have a nitrogen-packed crystal face, for example, the (001) face in the case of aluminum nitride. Specifically, its thickness may be 0.05 $\mu$m or greater, preferably, 0.1 $\mu$m or greater. If its thickness is too much on the other hand, the nitrogen-containing compound layer may be chipped off or damaged. For this reason, the thickness may be 10 $\mu$m or less, preferably, 5 $\mu$m or less.

Besides the nitrogen-containing compound layer, the intermediate layer may also contain other layers such as the first and second adhesion enhancement layers which serve to enhance the adhesion between the substrate and nitrogen-containing compound layer. In this case, the overall thickness of the intermediate layer may be 0.05 $\mu$m to 15 $\mu$m, preferably, 0.1 $\mu$m to 10 $\mu$m in view of the intermediate layer chipping resistance and strength of the intermediate layer itself.

As specific examples of these intermediate layers, there may be mentioned layers of AlN, GaN, InN, TlN, Al(N,O), Ga(N,O), (Al,Ga)N, (Al,In)N, (Al,Tl)N, (Al,Ga)(N,O) and the like as nitrogen-containing compound layers; and layers of $Al_2O_3$, $Ga_2O_3$, $In_2O_3$, $Tl_2O_3$, CaO, SrO, BaO, RaO, BeO, MgO, $Sc_2O_3$, $Y_2O_3$, $La_2O_3$, $CeO_2$, $Ce_2O_3$, $Nd_2O_3$, $Sm_2O_3$, $PrO_2$, $Gd_2O_3$, $Dy_2O_3$, $Eu_2O_3$, $SiO_2$, $Ca_3N_2$, $Sr_3N_2$, $Ba_3N_2$, $Ra_3N_2$, $Be_3N_2$, $Mg_3N_2$, ScN, YN, LaN, CeN, $Si_3N_4$, (Si,Al)(O,N), $(Al,Y)_2O_3$ and the like as first adhesion enhancement layers. Illustrative of the second adhesion enhancement layer composed of at least one component selected from the carbides, nitrides, oxides, borides and silicides of metals of Groups IVa, Va and VIa of the Periodic Table and mutual solid solutions thereof, may be mentioned layers of TiC, ZrC, HfC, VC, TaC, NbC, $Cr_3C_2$, $Cr_7C_3$, $Mo_2C$, WC, TiN, ZrN, VN, TaN, CrN, TiO, $TiO_2$, $ZrO_2$, $Ta_2O_5$, $WO_3$, $TiB_2$, $VB_2$, $TaB_2$, $TiSi_2$, $TaSi_2$, Ti(N,C), (Ti, Ta)C, (Ti,W)C, Ti(N,O), Ti(C,N,O), (Ti,Ta,W)C and the like. These intermediate layers may be made not only as stoichiometric compounds but also non-stoichiometric compounds. These non-stoichiometric compounds may also be formed as substoichiometric compounds in each of which the ratio of non-metallic element(s) to metallic element(s) is small.

In the present invention, the above-mentioned cubic boron nitride material is prepared by the following manner. Namely, an inner layer composed of a single intermediate layer or a plurality of intermediate layer and an outer layer made principally of cubic boron nitride are provided on a surface of a substrate. The intermediate layer is interposed between the substrate and outer layer. The single intermediate layer or the outermost one of the plurality of intermediate layers is a layer of at least one nitrogen-containing compound selected from the nitrides and nitroxides of Al, Ga, In and Tl and mutual solid solutions thereof. The outer layer is formed through its oriented growth on a face of the layer of said at least one nitrogen-containing compound, said face being densely packed with nitrogen atoms. The formation of the outer layer through its oriented growth on the nitrogen-packed face of the nitrogen-containing compound layer may be effected in various ways. In particular, it is most preferable to conduct it under high-pressure and high-temperature conditions, under which cubic boron nitride is stable, from the viewpoint of acceleration of the oriented growth of cubic boron nitride. Preferably, these conditions include as pressure of 4.5 GPa or higher and a temperature of 700° C. or higher.

Illustrative substrates useful in the method of this invention for the production of cubic boron nitride coated materials may include metals, alloys, sintered hard alloys, cermets and ceramics, which can withstand the above-mentioned high-pressure and high-temperature conditions. Plates, ingots, powders and green compacts may be used as starting materials for these substrates. When plates or ingots are used as starting materials, it is preferable to subject a surface of each substrate to a nitriding or carburizing treatment or to polish, wash and dry the surface of the substrate as needed because its adhesion properties to the corresponding intermediate layer can be improved.

The intermediate layer may be provided on the surface of the corresponding substrate in various ways. When the nitrogen-containing compound layer, the first adhesion enhancement layer and the second adhesion enhancement layer composed of at least one component selected from the carbides, nitrides, oxides, borides and silicides of metals of Groups IVa, Va and VIa of the Periodic Table and mutual solid solution thereof are provided by way of example, they may be formed as layers in the form of thin films by a CVD, PVD or plasma-assisted CVD method. Alternatively, after vacuum-deposition of metals, they may be converted to layers of metal compounds by carburizing and/or nitriding treatments. As another alternative, they may be sprayed or brushed in powdery forms. As a further alternative, they may also be provided in the form of green compacts by dry pressing. As a still further alternative, they may also be provided in the form of plates.

When it is required to provide a layer of a metal or alloy as an intermediate layer on a surface of a substrate in order to enhance the adhesion of its associated outer layer to the surface of the substrate, the layer of the metal or alloy may be formed by deposition besides PVD method such as vacuum evaporation, ion plating or sputtering.

Starting materials useful for the formation of outer layers may include amorphous boron nitride, hexagonal boron nitride, rhombohedral boron nitride and wurtzite-type boron nitride as well as their mixtures with cubic boron nitride. When cubic boron nitride is present in a starting material provided for the formation of an outer layer, the cubic boron nitride accelerates the transformation of the starting material into cubic boron nitride. Inclusion of cubic boron nitride is therefore preferred for the formation of an outer layer. Needless to say, cubic boron nitride can be used, as is, for the formation of an outer layer. In addition, amorphous boron nitride which can be obtained by the thermal decomposition of borazine or a derivative thereof under pressure and contains hydrogen is preferred as a starting material for the formation of an outer layer since the activation energy required for its transformation to cubic boron nitride is low. Further, a mixture of hexagonal boron nitride, amorphous boron nitride or hydrogen-containing amorphous boron nitride and at least one material selected from borazine, borazine derivatives and materials containing boron, nitrogen and hydrogen and capable of yielding boron nitride is preferred as a starting material for the formation of an outer layer because the latter component facilitates the transformation of the former component into cubic boron nitride.

The term "borazine" as used herein means a compound having as chemical formula, $B_3N_3H_6$. On the other hand, the term "borazine derivatives" indicates boron-nitrogen-hydrogen compounds of 6-membered ring structures such as 2,4-diaminoborazine ($B_3N_5H_8$), borazonaphthalene ($B_5N_5H_8$) and borazobiphenyl ($B_6N_6H_{10}$) by way of example. By the term "materials containing boron, nitrogen and hydrogen and capable of yielding boron nitride" are meant, for example, those formed of boron hydride and ammonia or hydrazine such as diborane ($B_2H_6$), tetraborane ($B_4H_{10}$), pentaborane-9 ($B_5H_9$), octaborane-12 ($B_8H_{12}$) and decaborane ($B_{10}H_{14}$).

Among borazine, borazine derivatives and materials containing boron, nitrogen and hydrogen and capable of yielding boron nitride, those being liquid at room temperature such as borazine, 2,4-diamino-borane, pentaborane-9, pentaborane-11 and hexaborane-12 are preferred as starting materials for the formation of outer layers because the transformation of powder or a green compacts of hexagonal boron nitride, amorphous boron nitride or hydrogen-containing amorphous boron nitride into cubic boron nitride is facilitated when it is wet with such liquid starting materials.

As a starting materials useful in the formation of an outer layer, it is possible to incorporate at least one of Fe, Ni, Co, Al, Si and metals of Group IVa, Va and VIa of the Periodic Table, the carbides, nitrides and borides of metal of Groups IVa, Va and VIa of the Periodic Table and mutual solid solutions thereof in a material which can be transformed into cubic boron nitrides, such as that mentioned above.

The producing method according to this invention for the production of a cubic boron nitride material is now specifically described. In a first method, when a substrate as a starting material is, for example, a plate or ingot made of a drawn product, rolled product, cast product, forged product or sintered product, an intermediate layer is provided by CVD, PVD or plasma-assisted CVD method after polishing, washing and drying a surface of the substrate. Thereafter, in order to form an outer layer in the form of a thin layer on the order of 0.05 μm to 20 μm for example, a starting material adapted to form an outer layer by CVD, PVD or plasma-assisted CVD method is provided on the surface of the intermediate layer. The substrate with the intermediate layer and the starting material for the outer layer is then place in a belt-type or girdle-type high-pressure and high-temperature apparatus, in which the starting material is treated under high-pressure and high-temperature conditions under which cubic boron nitride is stable.

In a second method, a substrate similar to that employed in the first method is used as a starting material. After forming an intermediate layer on a surface of the substrate in the same manner as the first method, a starting material adapted to form an outer layer is provided in the form of powder or a green compact on the surface of the intermediate layer in order to form the outer layer in the form of a thick film, for example, on the order of about 0.1 mm to 0.8 mm. The substrate with the intermediate layer and the starting material for the outer layer is then placed in a high-pressure and high-temperature apparatus, in which the starting material is treated under high-pressure and high-temperature conditions under which cubic boron nitride is stable.

In a third method, a substrate similar to that employed in the first method is used as a starting material. After forming an intermediate layer in the form of powder, as green compact or a plate on a surface of the substrate, a starting material adapted to form an outer layer is provided in the form of powder or a green compact on the surface of the intermediate layer. The substrate with the intermediate layer and the starting material for the outer layer is then placed in a high-pressure and high-temperature apparatus, in which the starting material is treated under high-pressure and high-temperature conditions under which cubic boron nitride is stable.

In a fourth method, starting materials adapted to form a substrate, intermediate layer and outer layer are all provided in the form of powders and/or green compacts. They are thereafter placed in a high-pressure and high-temperature apparatus, in which the starting materials are treated under high-pressure and high-temperature conditions under which cubic boron nitride is stable.

In the above description, the oriented growth of each outer layer was conducted under high-pressure and high-temperature conditions under which cubic boron nitride is stable. The oriented growth of an outer layer can however be effected by conventional PVD or plasma-assisted CVD method. Among the above-mentioned methods, the first or second method is preferred when an outer layer of particularly dense cubic boron nitride is desired or the strength of an intermediate layer is important.

The cubic boron nitride coated material according to this invention is coated material including a coating layer, which is composed of an intermediate layer and an outer layer, formed on a surface of a substrate. On the nitrogen-packed face of a nitrogen-containing compound layer as the intermediate layer, the nitrogen-packed face of cubic boron nitride has been allowed to undergo oriented growth as the outer layer. Accordingly, the outer layer contains cubic boron nitride at a high density and has properties similar to various good properties as high hardness, high heat conductivity and high electrical insulating property which cubic boron nitride has inherently. Since the outer layer has been formed by its oriented growth on the nitrogen-packed face of the nitrogen-containing compound layer as the intermediate layer, the outer layer has excellent adhesion property with the intermediate layer. Since this intermediate layer may be formed with a material suitable for the type of each substrate and into a constitution suitable for the type of each substrate, it has excellent adhesion property with the substrate. For the reasons mentioned above, the cubic boron nitride coated material according to this invention can fully exhibit the excellent properties of its outer layer.

Having generally described the invention, a more complete understanding can be obtained by reference to certain specific examples, which are provided herein for purposes of illustration only and are not intended to be limiting unless otherwise specified.

EXAMPLES

Example 1

After polishing the surface of a substrate formed of a sintered ceramic body, the composition of which was $Al_2O_3$-20 vol. % Ti(N,C) -0.5 vol. % MgO, and having dimensions of 10 mm across and 3 mm thick by means of as diamond grinding wheel, the substrate was washed with distilled water and ethyl alcohol and then dried. The substrate was then placed in the reactor of a CVD aspparatus and held for 20 minutes at a pressure of 70 Torr and temperature of 1,050° C. in an atmosphere consisting of 5 vol. % $AlCl_3$-35 vol. % $N_2$-60 vol. % $H_2$ to form an AlN layer on the surface of the substrate. After evacuation of the gas from the reactor, the substrate was held for 120 minutes at a temperature of 50 Torr and a temperature of 1,000° C. in an atmosphere of 9 vol. % $BCl_3$-23 vol. % $H_2$-36 vol. % $NH_3$-32 vol. % Ar, thereby forming a layer of boron nitride on the surface of the AlN layer. At this stage, the layer of boron nitride was investigated by X-ray diffraction. As a result, it was found to be a mixture of amorphous boron nitride and hexagonal boron nitride. The substrate with both AlN layers was then placed in a high-pressure and high-temperature apparatus, in which they were treated at a pressure of 5.5 GPa and a temperature of 1,300° C. to obtain a coated material of this invention. The thus-obtained coated material according to this invention was investigated by X-ray diffraction and a scanning electron microscope. The outer layer was 2 $\mu$m thick layer of cubic boron nitride while the intermediate layer was 0.5 $\mu$m thick Al layer. The outer layer was a dense and uniform thin layer and its hardness was 5,300 kg/mm2 in terms of micro-Vickers hardness.

Example 2

After machining and treating the surface of a substrate formed of a sintered ceramic body the composition of which was $ZrO_2$-5 vol. % MgO, and having dimensions of 10 mm across and 3 mm thick in the same manner as in Example 1, the substrate was placed in the reactor of a CVD apparatus. The substrate was held for 120 minutes at a pressure of 30 Torr and a temperature of 1,100° C. in an atmosphere of 5 vol. % $AlCl_3$-10 vol. % CO -10 vol. % $CO_2$-75 vol. % $H_2$, therby forming an $Al_2O_3$ layer on the surface of the substrate. After evacuating the gas from the reactor, an AlN layer was formed on the surface of the $Al_2O_3$ layer under the same conditions as in Example 1. After evacuating the gas again from the reactor, as layer of boron nitride was formed on the surface of the Al layer under the same conditions as in Example 1. The substrate with the $Al_2O_3$, AlN and boron nitride layers was placed in a high-pressure and high-temperature and processed in the same manner as in Example 1, thereby obtaining a coated material according to this invention. The resultant coated material according to this invention was investigated by X-ray diffraction and a scanning electron microscope. The outer layer was found to be a 2 $\mu$m thick layer of cubic boron nitride whereas the intermediate layer was found to consist of an AlN layer of 0.5 μm thick and an Al$_2$O$_3$ layer of 0.5 μm thick. On the other hand, the outer layer was a dense and uniform, thin film and its hardness was 5,300 kg/mm$_2$ in terms of micro-Vickers hardness.

Example 3

After machining and treating the surface of a substrate made of a sintered hard alloy, the composition of which was WC - 10 vol. % Co, and having dimensions of 10 mm across and 3 mm thick in the same manner as in Example 1, the substrate was placed in the reactor of a CVD apparatus. The substrate was held for 30 minutes at a pressure of 20 Torr and a temperature of 1,000° C. in an atmosphere of 8 vol. % TiC$_4$-5 vol. % CH$_4$-87 vol. % H$_2$, thereby forming a TiC layer on the surface of the substrate. Thereafter, the substrate and TiC layer were treated through the same steps under the same conditions as in Example 2 to obtain a coated material according to this invention. The resultant coated material according to this invention was investigated by X-ray diffraction and a scanning electron microscope. The outer layer was found to be a 2 μm thick layer of cubic boron nitride whereas the intermediate layer was found to consist of an AlN layer of 0.5 μm thick an Al$_2$O$_3$ layer of 0.5 μm thick and a TiC layer of 0.5 μm. On the other hand, the outer layer was a dense and uniform, thin film and its hardness was 5,300 kg/mm$^2$ in terms of micro-Vickers hardness.

Example 4

After machining and treating the surface of a substrate made of sintered ceramic body, the composition of which was Si$_3$N$_4$-8 vol. % AlN -8 vol. % MgO, and having dimensions of 10 mm across and 3 mm thick in the same manner as in Example 1, an AlN layer was formed on the surface in the same manner as in Example 1. After providing on the surface of the AlN layer as green compact of nitrogen-containing amorphous boron nitride obtained by thermally decomposing borazine under pressure, the substrate with the green compact was placed in a high-pressure and high-temperature apparatus, in which they were treated at a pressure of 6 GPa and a temperature of 1,400 ° C. to obtain a coated material according to this invention. The resultant coated material acoording to this invention was investigated by X-ray diffraction and a scanning electron microscope. The outer layer was found to be a 0.4 mm thick layer of cubic boron nitride whereas the intermediate layer was found to consist of an AlN layer of 0.5 μm thick. On the other hand, the outer layer was a dense and uniform, thick film and its hardness was 5,700 kg/mm$^2$ in terms of micro-Vickers hardness.

Example 5

On the surface of substrate made of a sintered ceramic body, the composition of which was TiC -10 vol. % NbC -10 vol. % VC, and having dimensions of 10 mm across and 3 mm thick, an Al$_2$O$_3$ layer and AlN layer were formed in the same manner as in Example 2. After providing a green compact of amorphous boron nitride on the surface of the AlN layer, the substrate with the Al$_2$O$_3$ and AlN layers and green compact was placed in a high-pressure and high-temperature apparatus, in which they were treated at a pressure of 6 GPa and a temperature of 1,500° C. to obtain a coated material according to this invention. The resultant coated product according to this invention was investigated by X-ray diffraction and a scanning electron microscope. The outer layer was found to be a 0.2 mm thick layer of cubic boron nitride whereas that intermediate layer was found to consist of an AlN layer of 0.5 μm thick and an Al$_2$O$_3$ layer of 0.5 μm thick. On the other hand, the outer layer was a dense and uniform, thick film and its hardness was 5,500 kg/mm$^2$ in terms of micro-Vickers hardness.

Example 6

On the surface of a substrate formed of a sintered cermet alloy, the composition of which was TiC -5 vol. % TiN -2 vol. % WC -6 vol. % Mo$_2$C-10 vol. % Ni, and having dimensions of 10 mm across and 3 mm thick a TiC layer, Al$_2$O$_3$ layer and AlN layer were formed in order in the same manner as in Example 3. After providing a green compact of hexagonal boron nitride on the surface of the AlN layer, the substrate with the TiC, Al$_2$O$_3$ and AlN layers and the green compact was placed in a high-pressure and high-temperature apparatus, in which they were treated at 6.5 GPa and 1,600° C. to obtain a coated material according to this invention. The resultant coated material according to this invention was investigated by X-ray diffraction and a scanning electron microscope. The outer layer was found to be a 0.6 mm thick layer of cubic boron nitride whereas the intermediate layer was found to consist of an AlN layer of 0.5 μm thick, an Al$_2$O$_3$ layer of 0.5 μm thick and a TiC-Ni layer of 0.5 μm. On the other hand, the outer layer was a dense and uniform thick film and its hardness was 5,600 kg/mm$^2$ in terms of micro-Vickers hardness, a specific resistance was $1.3 \times 10^{-10}$ Ω−cm, and its dielectric constant was 8.3 as measured under 10 KHz.

Example 7

A mixed powder having a composition of WC-20 vol. % TiC -7 vol. % TaC -11 vol. % Co was placed in a mold, in which the mixed powder was pressed. Thereafter, Ti(C,N) powder, Y$_2$O$_3$ powder and AlN powder were sprinkled one after another in order with pressing after each sprinkling. The resultant green compact was then placed in a high-pressure and high-temperature apparatus, in which it was treated at a pressure of 6.0 GPa and a temperature of 1,450° C. to obtain a coated material according to this invention. The resultant coated material acoording to this invention was investigated by X-ray diffraction and a scanning electron microscope. The outer layer was found to be a 0.5 mm thick layer of cubic boron nitride whereas the intermediate layer was found to consist of an Al(N$_{0.99}$,O$_{0.01}$) layer of 0.3 mm thick, a Y$_2$O$_3$ layer of 0.2 mm thick and a Ti(C,N)-Co layer of 0.3 mm. On the other hand, the outer layer was a dense and uniform, thick film, and its hardness was 5,400 kg/mm$^2$ in terms of micro-Vickers hardness.

Example 8

After rapping, cleaning and drying the surface of a substrate having a composition equivalent to "Inconel 713c" (trade name) and dimensions of 10 mm×10 mm×1 mm, it was placed in the reactor of an ion plating apparatus. After evacuating the interior of the reactor, the reactor was heated to 500° C. at which Ar bombardment was carried out at 0.2 Torr for 10 minutes. Thereafter, a Ti ingot was caused to evaporate into Ti·ions by an electron beam gun under 6 KV and 0.4 A and C$_2$H$_2$ was introduced as reactant gas to a pressure of $5 \times 10^{-4}$ Torr. By applying a negative bias voltage of 100 V to the substrate, vacuum evaporation was conducted for 20 minutes. After evacuating the interior of the reactor, $O_2$ was introduced as a reactant gas to a pressure of $9 \times 10^{-4}$ Torr and an Al ingot was caused to evaporate into ions by an electron beam gun under 3 KV and 0.3 A. By applying a negative bias voltage of 20 V to the substrate, vacuum evaporation was conducted for 15 minutes. Subsequent to evacuation of the interior of the reactor, $N_2$ was introduced as a reactant gas to a pressure of $5 \times 10^{-4}$ Torr and an Al ingot was caused to evaporate into ions to conduct vacuum evaporation. A green compact of nitrogen-containing amorphous boron nitride, which had been obtained by thermal decomposition of borazine under pressure, was provided on the surface of the vacuum-deposited layer. The substrate with the green compact was placed in a high-pressure and high-temperature apparatus, in which the green compact was wet with borazine to eliminate voids. Thereafter, it was treated at a pressure of 6 GPa and a temperature of 1,000° C. to obtain a coated material according to this invention. The resultant coated material according to this invention was investigated by X-ray diffraction and a scanning electron microscope. The outer layer was found to be a 0.3 mm thick layer of cubic boron nitride whereas the intermediate layer was found to consist of an AlN layer of 1.0 μm thick, an $Al_2O_3$ layer of 0.5 μm thick and a TiC layer of 1.0 μm. On the other hand, the outer layer was a dense and uniform, thick film, and its hardness was 5,000 kg/mm² in terms of micro-Vickers hardness.

Example 9

After cleaning an drying the surface of a substrate made of a Mo plate having dimensions of 10 mm × 10 mm × 1 mm, the substrate was placed in the reactor of a CVD apparatus. It was then treated for 40 minutes at a pressure of 50 Torr and a temperature of 900° C. in an atmosphere of 8 vol. % $TiCl_4$-45 vol. % $N_2$-47 vol. % $H_2$, thereby forming as TiN layer on the surface of the substrate. After evacuation of the interior of the reactor, the substrate and TiN layer was treated for 180 minutes at a pressure of 70 Torr and a temperature of 900° C. in an atmosphere of 5 vol. % $AlCl_3$-5 vol. % CO -5 vol. % $CO_2$-85 vol. % $H_2$ so that an $Al_2O_3$ layer was formed on the surface of the TiN layer. After evacuation of the interior of the reactor, the substrate with the TiN and $Al_2O_3$ layers was treated for 40 minutes at a pressure of 70 Torr and a temperature of 900° C. in an atmosphere of 8 vol. % $AlCl_3$-35 vol. % $N_2$-57 vol. % $H_2$ to form an A layer on the surface of the $Al_2O_3$ layer. Subsequent to evacuation of the interior of the reactor, the thus-treated substrate was treated for 180 minutes at a pressure of 100 Torr and a temperature of 600° C. in an atmosphere of 5 vol. % $B_3N_3H_6$-35 vol. % $N_2$-60 vol. % $H_2$. Thereafter, the resultant substrate was placed in the high-temperature apparatus, in which it was treated at a pressure of 6 GPa and a temperature of 1,400° C. to obtain a coated material according to this invention. The resultant coated material according to this invention was investigated by X-ray diffraction and a scanning electron microscope. The outer layer was found to be a 0.2 μm thick layer of cubic boron nitride whereas the intermediate layer was found to consist of an AlN layer of 1.0 μm thick, an $Al_2O_3$ layer of 0.5 μm thick and a TiN layer of 1.0 μm. On the other hand, the outer layer was a dense and uniform, thick film, and its hardness was 5,400 kg/mm² in terms of micro-Vickers hardness.

Example 10

On the surface of a substrate formed of a sintered hard alloy having a composition of WC -10 vol. % Co and dimensions of 10 mm across and 5 mm thick, there were provided, in order, a Ti(C,N) green compact, an $Si_3N_4$-$Al_2O_3$ green compact on the surface of the Ti(C,N) green compact, an AlN green compact on the surfacc of the $Si_3N_4$-$Al_2O_3$ green compact, and a green compact of 10 vol. % TiN -3 vol. % WC -2 vol. % Ni -30 vol. % cubic BN -55 vol. % amorphous BN. The substrate with the green compacts was placed in a high-pressure and high-temperature apparatus, in which they were treated at a pressure of 6 GPa and a temperature of 1,450° C. to obtain a coated material according to this invention. The resultant coated material according to this invention was investigated by X-ray diffraction and a scanning electron microscope. The outer layer was found to be a 0.4 mm thick layer made principally of cubic boron nitrides whereas the intermediate layer was found to consist of an $Al(N_{0.99}, O_{0.01})$ layer of 0.2 mm thick, an (Si,Al)(N,O) layer of 0.2 mm thick, and a Ti(C,N)-Co layer of 0.2 mm thick. The hardness of the outer layer was 4,300 kg/mm² in terms of micro-Vickers hardness.

Having now fully described the invention, it will be apparent to one of ordinary skill in the art that many changes and modifications can be made thereto without departing from the spirit or scope of the invention as set forth herein.

We claim:

1. A cubic boron nitride coated material comprised of a substrate, an outer layer consisting essentially of cubic boron nitride, said outer layer being provided on a surface of the substrate, and at least one intermediate layer interposed between the substrate and the outer layer, said intermediate layer comprising at least one nitrogen-containing compound selected from the group consisting of nitrides and nitroxides of Al, Ga, In and Tl and mutual solid solutions of the aforesaid nitrides and nitroxides, wherein
    (i) said intermediate layer presents a densely nitrogen-packed crystalline surface upon which said outer layer is formed and
    (ii) said outer layer, in its outermost portion, presents a crystalline face that lies substantially in a (111) plane.

2. A cubic boron nitride coated material according to claim 1, wherein said intermediate layer is comprised of the layer of comprising said nitrogen-containing compound and a first adhesion enhancement layer comprising at least one component selected from the group consisting of (a) oxides of Al, Ga, In and Tl, (b) oxides and nitrides of alkaline earth metals, rare earth metals and Si, and (c) mutual solid solutions of (a) and (b), wherein said first adhesion enhancement layer is adjacent to said substrate.

3. A cubic boron nitride coated material according to claim 1, wherein said intermediate layer is comprised of (1) a layer comprising said nitrogen-containing compound, (2) a first adhesion enhancement layer comprising at least one component selected from the group consisting of (a) oxides of A1, Ga, In and Tl, (b) oxides and nitrides of alkaline earth metals, rare earth metals and Si, and (c) mutual solid solutions of (a) and (b), and (3) a second adhesion enhancement layer comprising at least one component selected from the group consisting of carbides, nitrides, oxides, borides and silicides of metals of groups IVa, Va and VIa of the Periodic Table and mutual solid solutions thereof, said first adhesion promoting layer being adjacent to said layer (1) and said second adhesion promoting layer being interposed between said first adhesion promoting layer and said substrate.

4. A cubic boron nitride coated material according to claim 3, wherein said second adhesion enhancement layer further comprises at least one additional component selected from Fe, Ni, Co, Cr, Mo and W.

5. A cubic boron nitride coated material according to claim 3, wherein said intermediate layer has a thickness ranging between about 0.05 and 15 μM.

6. A cubic boron nitride coated material according to claim 1, wherein said intermediate layer has a thickness ranging between about 0.05 and 10 μm.

7. A cubic boron nitride coated material according to claim 1, wherein the intermediate layer has a multi-layered structure such that a layer comprising said nitrogen-containing compound is adjacent to the outer layer.

8. A cubic boron nitride coated material according to claim 1, wherein said densely nitrogen-packed crystalline surface is a (001) crystal face.

* * * * *